Feb. 14, 1950   G. F. DALES   2,497,397
THERMOSTAT SWITCH
Filed Jan. 19, 1946
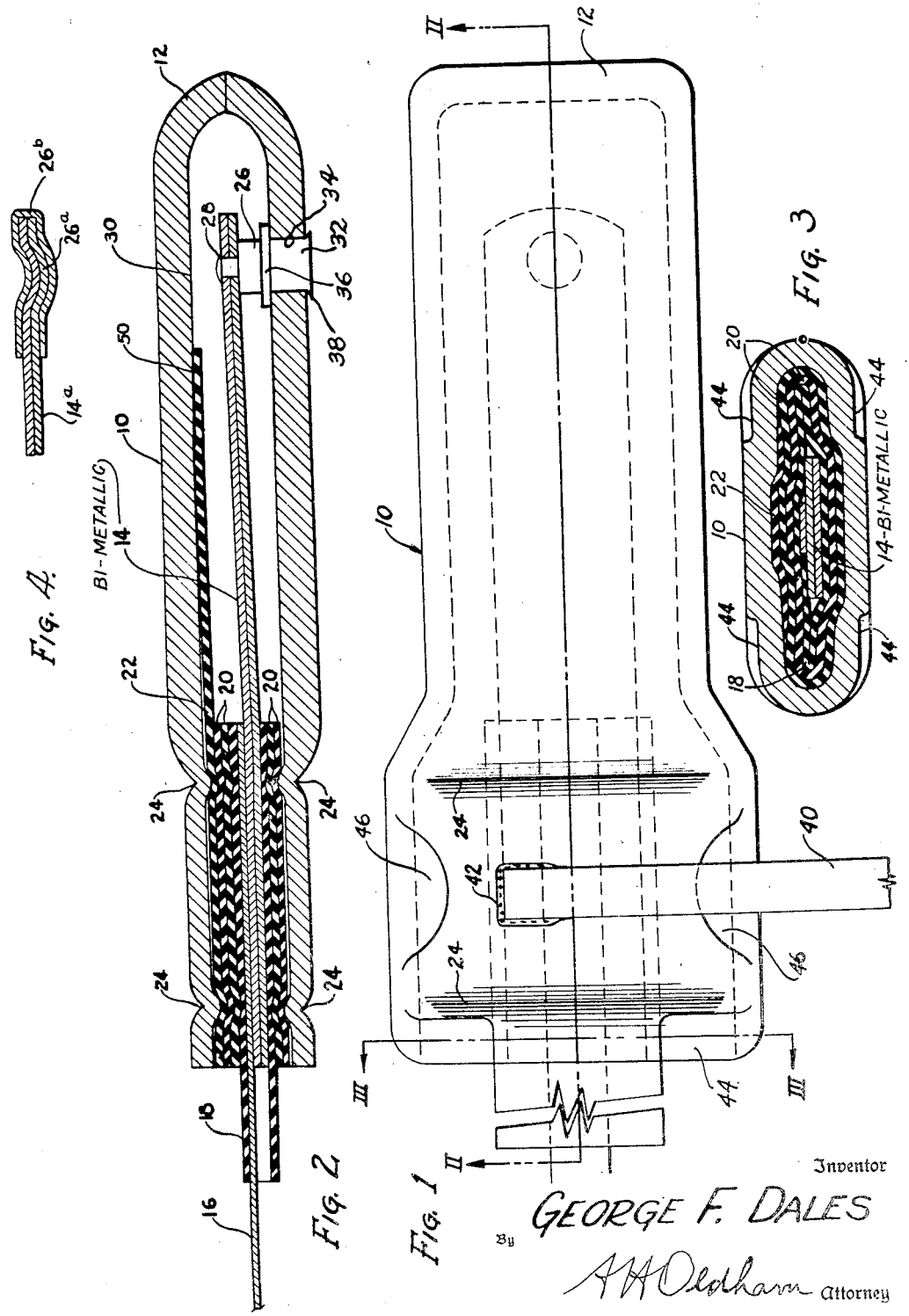
Inventor
GEORGE F. DALES
By A. H. Oldham Attorney Patented Feb. 14, 1950

2,497,397

UNITED STATES PATENT OFFICE 2,497,397

THERMOSTAT SWITCH

George Franklin Dales, Akron, Ohio

Application January 19, 1946, Serial No. 642,188

6 Claims. (Cl. 200—138)

This invention relates to thermostats, and, more particularly, to thermostat switches adapted to automatically turn on and off an electric current in response to temperature variations.

Heretofore, various thermostat switches have been provided to perform a variety of operations under various temperature ranges. However, in known thermostat switches considerable difficulty has been experienced in initially setting the thermostat to the desired operating temperature, and in holding the thermostat within reasonable percentage variations over its operating life. Moreover, so far as I am aware, no thermostat switches are available on the market of very small, thin character, which, for certain uses, is necessary or highly desirable. Still again, existing thermostat switches in smaller sizes are usually made with thin sheet metal casings which are subject to pressure distortions which may seriously affect the operating characteristics of the thermostat. Such sheet metal casings are not liquid or gas tight, in any sense of the word, and this is usually objectionable.

Conventional thermostats have employed relatively thick contact points, of silver or the like, and have used two of such contact points which has made the over-all thickness of the thermostat switch somewhat greater than the sum of the thickness of the contact points, plus the thickness of the casing. The result has been a thermostat switch of considerable thickness which is objectionable when the thermostat switch is or must be used in an electric heating pad, or other similar installations, because the thermostats can be easily felt through the fabric of the heating pad, and are in the form of an objectionable lump. Furthermore, conventional thermostats have had cases made of sheet metal, as noted heretofore, such cases having relatively square corners, and projecting terminals, which corners when employed in conjunction with a heating pad, or the like, are apt to tear the fabric of the heating pad, and the projecting terminals may punch through the fabric.

It is the general object of my invention to avoid and overcome the foregoing and other objections to and difficulties of prior known thermostat switch constructions by the provision of an improved thermostat switch having a very small size, high rigidity, no sharp corners, and excellent and continuing temperature response over long periods of use without adjustments.

Another object of my invention is to provide an improved thermostat of the type described which is durable and accurate, although of small size, and which is relatively inexpensive to manufacture.

Another object of my invention is the provision of a thermostat switch in which the over-all thickness of the unit is considerably reduced by employing only one contact point, the other contact point being combined with the thickness of the casing.

Another object of my invention is to provide a thermostat switch of the type indicated including a case made from a flattened metal tube to provide high strength and permanent adjustment characteristics, and with the thermostat switch being substantially sealed.

Another object of my invention is the provision of a thermostat switch including a bi-metal strip rigidly held in insulated relation to the casing at transversely extending areas spaced longitudinally of the bi-metal strip.

Another object of my invention is to provide a thermostat which can be readily set to the desired operating temperature without adjusting screws, and which will continue to operate over long periods of time at the set temperature and without losing this characteristic.

The foregoing objects of my invention, and other objects which will become apparent as the description proceeds, are achieved by the provision of a thermostat comprising a flattened tubular metal case, a bi-metal strip extending substantially centrally of the case, insulation between one end of the strip and the case, the case being compacted against the insulation and strip from both top and bottom in transversely-directed, longitudinally-spaced areas to provide a two point cantilever support for the strip, an electric contact carried by the unsupported end of the strip, and a thin layer of metal integral with the inside of the case adapted to engage with the contact. Completing the assembly, of course, are electric connections, usually in the form of flexible, flat, braided wire, which are connected to the bi-metal strip and to the case.

For a better understanding of my invention, reference should be had to the accompanying drawing wherein:

Fig. 1 is a plan view, in greatly enlarged form, of a thermostat switch incorporating the features of my invention;

Fig. 2 is a longitudinal vertical cross-sectional view taken on line II—II of Fig. 1;

Fig. 3 is a transverse vertical cross-sectional view taken substantially on line III—III of Fig. 1; and Fig. 4 shows a modified structure for the contact on the end of the b-metal strip.

In the drawings, the numeral 10 indicates generally the metallic case or cover of the thermostat switch, and this is made from a flattened metal tube, usually hard drawn copper, or, if greater strength is a requisite, from steel. One end of the case 10, as at 12, is closed by forming the metal over on the radius shown to bring the ends of the tube into sealing contact. In many installations the upsetting or squeezing of the metal to form the closed end of the tube provides an adequate closure or seal for the tube end. In certain instances where it is advisable to completely seal the end of the case, brazing or solder can be added to the seam at the end of the case to insure an absolute seal.

The open end of the case 10 receives a bi-metal strip 14, and this strip can take any of the known forms of bi-metal strips which are responsive to heat. The exact material employed in the bi-metal strip 14 forms no part of the present invention, it only being requisite that the bi-metal strip 14 will move through the desired arc under the required temperature variations. The bi-metal strip 14 extends substantially centrally of the case 10, and terminates just short of the closed end 12 of the case. The strip 14 is supported as a cantilever in the case 10 in a manner which will now be described.

After electrically securing a wire braid 16, as by solder or weld, to the bi-metal strip 14, a tube of suitable insulating material, indicated by the numeral 18, and for example, fiber glass, is slipped over the end of the strip 14 adjacent the point of juncture of the wire braid 16. Additional insulating material, usually in the form of layers or wraps, 20, of fiber glass, for example, are then positioned around the tube 18, and a sheet of mica, 22, or other impervious insulating material is placed between the top of the insulating materials and the case 10. Then the case 10 is compacted about the insulating layers and they, in turn, are compacted down against the bi-metal strip 14 by the application of relatively heavy pressure which is concentrated to form on the top and bottom of the case transversely extending grooves or stakes, 24, which are spaced longitudinally from each other along the case to provide a two point support of cantilever character for the strip 14. It will be recognized that the grooves 24 on the outside of the case 10 result in the formation of ribs on the inside of the case which act as lands or line-like contact areas spaced longitudinally of the strip 14 and extending transversely thereof. There is thus provided a very excellent and positive means for gripping the bi-metal strip, which, together with the inherent rigidity of the flattened tube case 10 provides a thermostat switch structure having unusual and extremely high and constant temperature response even after extended use.

The compacting of the case 10 around the insulation and down against the bi-metal strip 14 effects a much better seal at the end of the case 10 than has been possible in existing types of thermostat switches. For many installations, the seal is entirely satisfactory, but in some particular installations, a more complete seal may be desired. An improved seal can be effected by employing impervious insulating material, such as mica, instead of the fiber glass, throughout the entire insulating body, and further improvement can be made by coating the end of the case 10 adjacent the wire braid 16 with insulating and sealing lacquers to provide a completely gas and liquid tight thermostat switch.

The unsupported end of the bi-metal strip 14 has secured thereto a contact point 26 of a metal resistant to arcing corrosion, such as silver, and this contact point may be conveniently attached to the strip 14 by welding, or, as shown, by providing a boss portion 28 which extends through a hole in the strip, with the upper end of the boss being peened over against the top of the strip. Still again, I may merely form a dimple or other offset in the end of the strip 14 in the direction of the case, and then plate the offset in the strip end with silver or the like. See, for example, Fig. 5 wherein 14a illustrates the bi-metal strip, 26a indicates the dimple, and 26b marks the plating.

An important part of my invention is to combine the second contact point, usually associated with contact point 26, as a part of the case 10. This I achieve in the form of the invention shown in Fig. 1 by providing a plug or button 32 of arc corrosion resistant metal, such as silver, which is adapted to be secured in a hole 34 extending through the wall of the case 10. The plug 32 may be made of a somewhat greater diameter than the contact point 26 with which it cooperates, and a small shoulder 36 prevents the plug from moving outwardly of the case 10a. The outer end of the plug 32 is spun or peened over, as at 38, to hold the plug in position in the case 10. Of course, the plug 32 may be screwed into a tapped hole in the case as an alternative construction. Such a screw would ordinarily be cut off flush with the outside of the case with the temperature adjustment being made as hereinafter described without adjusting the screw.

It should be noted, also, that I contemplate making the entire case 10 of the arc resistant metal if thickness is highly important, although that is a more expensive construction, as will be recognized, than the use of the modification shown in Fig. 4.

A second wire braid or conductor 40 is electrically connected to the case 10, and this is usually done at the compacted open end of the case, as by solder 42, and in the area of the case where the layer of mica 22 separates the remainder of the insulation from the case. In this manner, any possible flow of solder by capillary attraction from the joint between the wire braid 16 and the strip 14 through the glass fiber insulation to the case is prevented, with the possible attendant grounding action. Of course, the wire braid 40 may be soldered or welded to the case prior to the compacting of the end of the case around the insulation, but when this is done the compacting dies will have to be constructed to permit the wire braid 40 to extend through them without interfering with the compacting action. It is usually more convenient to solder the wire braid 40 in place after the compacting of the case end.

Looking for a moment at Fig. 3 of the drawings, it will be recognized that the compacting dies are constructed to produce the grooves or stakes 24, and, also, to produce flattened areas or lands 44 adjacent the end of the case 10, and flattened areas or lands 46 adjacent the sides of the compacted portion of the case. The grooves or stakes 24 and the compacted lands 44 and 46 effect a very excellent grip and seal between the case 10, the insulating material and the bi-metal strip 14.

Although usually not necessary, in certain constructions and installations of my improved thermostat switch, it may be advisable to extend the insulation 22, as at 50, which prevents the bi-metal strip 14 from ever electrically contacting the case 10 when the thermostat is subjected to sufficient heat to break the contact point 26 and the case 10.

An important part of my invention is the simplicity of adjusting my improved thermostat switch to operate at a given temperature, and with the attendant rigidity of adjustment when once made. This is achieved by assembling the various parts of the thermostat switch in the manner heretofore described, with the bi-metal strip 14 in initially assembled relation, and at room temperature functioning to maintain a firm contact between the contact point 26 and the covering 30 on the case 10. The thermostat is then positioned in a suitable opening in a relatively heavy metal block, the opening adapted to closely receive and support the uncompacted portion of the case 10. The metal block is maintained at the temperature at which the thermostat is desired to operate to open the electric circuit and the thermostat is connected in an electric circuit including a signal light or buzzer. The compacted end of the thermostat case extends out the top of the block, and this is gripped with a bar or is struck lightly with a hammer to bend a permanent set into the case 10. The bending of the case 10 is continued until the signal light, or buzzer, in the circuit including the thermostat just flutters on and off, at which time the thermostat is known to be and is calibrated to operate substantially at the temperature of the block. A little practice in this maneuver by the ordinary operator or employee will result in a high degree of skill in rapidly and accurately calibrating the thermostat.

From the foregoing, it will be recognized that the various objects of my invention have been achieved by the provision of a relatively simple, inexpensive, but rugged and highly accurate and long lived thermostat switch characterized by extreme compactness of size, sealed, or substantially sealed construction, and by the absence of any calibrating or adjusting screws. Although many of the features of my invention may be employed to construct a thermostat of any size, the invention is primarily concerned with small thermostat switches handling relatively light electric current. I have constructed many thermostat switches in accordance with the invention which have been only seven-eighths of an inch long, five-sixteenths of an inch wide, and one-tenth of an inch thick, and these switches have been found to handle many thousands of breaks of electric current of an amount used in electric heating pads. In fact, the thermostat switch of my invention is adapted for use in an electric heating pad, it being extremely thin and short, and not having any sharp corners or projecting connecting terminals to tear on or pierce the fabric of the heating pad.

It will be understood, however, that my improved thermostat switch will have a wide variety of uses wherever a small, compact, efficient and highly accurate thermostat is required.

It is to be noted that in the thermostat illustrated and described the bi-metal strip 14 may be positioned to move to open the contacts upon a temperature rise and to close the contacts on a temperature drop, or, the strip 14 may be reversed, i. e., turned over, so that it will move to close the contacts upon a temperature rise and will open the contacts upon a temperature drop.

While in accordance with the patent statutes, I have specifically illustrated and described my advance in the art, it will be recognized that I am not to be limited thereto or thereby, but that the scope of my invention is defined in the appended claims.

What I claim is:

1. A thermostat switch including a flattened tubular case of electro-conductive material, said case being closed and substantially sealed at one end, a strip of thermally-responsive bi-metal received in the other end of the case and extending substantially centrally into the open end of the case almost to the closed end thereof, a tube of fiber glass insulation around the end of the bi-metal strip adjacent the open end of the case, an electrical connector secured to the bi-metal strip and extending out the open end of the case, a layer of mica insulation between one side of the first-named insulation and the case, the case being compacted around the insulation and bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation and compacting it against the bi-metal strip, each side of the case being flattened into lands at the open end of the case between the parallel ribs to compact the insulation, such ends terminating short of the sides of the strip, an electrical connection to the outside of the case adjacent the mica insulation, an electric contact point secured to the unsupported end of bi-metal strip, and contact means of arc-resisting metal on the inside of the case adjacent the contact point.

2. A thermostat switch including a flattened tubular case of electro-conductive material, a strip of thermally-responsive bi-metal received in one end of the case and extending substantially centrally into the end of the case almost to the other end thereof, a tube of insulation around the end of the bi-metal strip adjacent the open end of the case, an electrical connector secured to the bi-metal strip and extending out the open end of the case, the case being compacted around the insulation and bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation and compacting it against the bi-metal strip, each side of the case being flattened into lands at the open end of the case between the parallel ribs to compact the insulation, such lands terminating short of the sides of the strip, an electrical connection to the outside of the case, an electric contact point secured to the unsupported end of bi-metal strip, and contact means of arc-resisting metal on the inside of the case adjacent the contact point.

3. A thermostat switch including a flattened tubular case of electro-conductive material, a strip of thermally-responsive bi-metal received in one end of the case and extending substantially centrally of the case almost to the other end thereof, insulation around the end of the bi-metal strip adjacent the said one end of the case, an electrical connector secured to the bi-metal strip and extending out the said one end of the case adjacent the said one end, the case being compacted around the insulation and bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation and compacting it against the bi-metal strip, an electrical connection to the outside of the case, an electric contact point secured to the unsupported end of the bi-metal strip, and a contact having a stem portion carried in the side wall of the case adjacent the contact point, the stem portion of the contact having a greater diameter than the contact point.

4. A thermostat switch including a flattened tubular case of electro-conductive material, a strip of thermally-responsive bi-metal received in one end of the case and extending substantially centrally toward the other end of the case almost to the end thereof, a plurality of layers of insulation around the end of the bi-metal strip adjacent the said one end of the case, at least part of the insulation extending into the case to prevent the unsupported end of the bi-metal strip from contacting one side of the case, an electrical connector secured to the bi-metal strip and extending out the said one end of the case, the case being compacted adjacent the said one end around the insulation and bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation and compacting it against the bi-metal strip, and said compacting being concentrated also at the sides of the case between the ribs to provide inwardly directed convex lands, an electrical connection to the outside of the case, and an electric contact point secured to the unsupported end of bi-metal strip.

5. A thermostat switch including a flattened tubular case of electro-conductive material, said case being closed and substantially sealed at one end, a strip of thermally-responsive bi-metal received in the other end of the case and extending substantially centrally into the open end of the case almost to the closed end thereof, a tube of insulation around the end of the bi-metal strip adjacent the open end of the case, at least part of the insulation extending into the case to prevent the unsupported end of the bi-metal strip from contacting one side of the case, an electrical connector secured to the bi-metal strip and extending out the open end of the case, the case being compacted around the insulation and bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation and compacting it against the bi-metal strip, each side of the case being flattened into lands at the open end of the case between the parallel ribs to compact the insulation, such lands terminating short of the sides of the strip, an electrical connection to the outside of the case, an electric contact point secured to the unsupported end of bi-metal strip, and a contact means of arc-resisting metal integral with the case adjacent the contact point.

6. A thermostat switch including a case, a strip of thermally-responsive bi-metal received in one end of the case and extending substantially centrally almost to the other end thereof, insulation means around the end of the bi-metal strip adjacent the one end of the case, an electrical connector secured to the bi-metal strip and extending out the one end of the case, the case being compacted around the insulation and the bi-metal strip to hold the bi-metal with a cantilever support extending into the case, the compacting being concentrated at points spaced longitudinally of the bi-metal strip and extending laterally thereof to provide parallel ribs on the top and bottom of the inside of the case engaging the insulation means and compacting it against the bi-metal strip, said compacting being also concentrated between the ribs to provide on the top and bottom of each side of the case flat convexly-shaped lands said lands compacting the case and insulation only and being spaced from the strip, an electrical connection to the outside of the case, an electric contact point secured to the unsupported end of bi-metal strip, and contact means on the inside of the case adjacent the contact point.

GEORGE FRANKLIN DALES.

REFERENCES CITED

The following references are of record in the file of this patent:

UNITED STATES PATENTS

| Number | Name | Date |
|---|---|---|
| 1,506,769 | Newell | Sept. 2, 1924 |
| 1,731,822 | Mau | Oct. 15, 1929 |
| 1,758,177 | Skinner | May 13, 1930 |
| 1,901,775 | Reichold | Mar. 14, 1933 |
| 2,268,445 | Drapeau | Dec. 30, 1941 |
| 2,317,828 | Turenne | Apr. 27, 1943 |

FOREIGN PATENTS

| Number | Country | Date |
|---|---|---|
| 428,874 | Great Britain | May 21, 1935 |